United States Patent
Atta et al.

(10) Patent No.: US 8,370,394 B2
(45) Date of Patent: Feb. 5, 2013

(54) PARALLEL PROCESSING OF DATA ORGANIZED IN A TREE STRUCTURE

(75) Inventors: Islam Atta, El-Ahram Giza (EG); Hisham El-Shishiny, El-Ahram Giza (EG)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 12/835,916

(22) Filed: Jul. 14, 2010

(65) Prior Publication Data

US 2011/0016153 A1    Jan. 20, 2011

(30) Foreign Application Priority Data

Jul. 17, 2009   (EP) .................................... 09165772

(51) Int. Cl.
*G06F 7/00*    (2006.01)
*G06F 17/30*   (2006.01)
(52) U.S. Cl. ........................................ 707/797
(58) Field of Classification Search .............. 707/797
See application file for complete search history.

(56) References Cited

U.S. PATENT DOCUMENTS

| | | | | |
|---|---|---|---|---|
| 6,938,204 B1* | 8/2005 | Hind et al. | ..................... | 715/234 |
| 7,676,814 B2* | 3/2010 | Karighattam et al. | ........ | 719/319 |
| 2004/0044874 A1* | 3/2004 | Leach et al. | .................. | 711/220 |
| 2005/0039117 A1* | 2/2005 | Lwo | ............... | 715/513 |
| 2006/0259744 A1* | 11/2006 | Matthes | ......................... | 712/220 |
| 2007/0189291 A1* | 8/2007 | Tian | .............................. | 370/390 |
| 2007/0294512 A1* | 12/2007 | Crutchfield et al. | ........... | 712/200 |
| 2008/0022259 A1* | 1/2008 | MacKlem et al. | ............ | 717/113 |
| 2008/0270435 A1* | 10/2008 | Furusho | ......................... | 707/101 |
| 2009/0077009 A1* | 3/2009 | Miszczyk et al. | ................. | 707/2 |
| 2009/0091087 A1* | 4/2009 | Wasmund | ...................... | 273/430 |
| 2009/0106194 A1* | 4/2009 | Furusho | ............................ | 707/3 |
| 2009/0228685 A1* | 9/2009 | Wei et al. | ......................... | 712/31 |
| 2009/0327464 A1* | 12/2009 | Archer et al. | .................. | 709/223 |
| 2010/0094800 A1* | 4/2010 | Sharp | .............................. | 706/55 |
| 2011/0016153 A1* | 1/2011 | Atta et al. | ..................... | 707/797 |

OTHER PUBLICATIONS

K. Asanovic, R. Bodik, B. Catanzaro, J. Gebis, P. Husbands, K. Keutzer, D. Patterson, W. Plishker, J. Shalt, S. Williams, K. Yelik. "The Landscape of Parallel Computing Research: A View from Berkeley". Technical report, EECS Department, University of California at Berkeley, UCB/EECS-2006-183, Dec. 2006.

Programming the Cell Broadband Engine Architecture: Examples and Best Practices, IBM Redbook.

Efficient implementations of search trees on parallel distributed memory architectures, Computers and Digital Techniques, IEEE Proceedings, Colbrook A., Smythe C.

(Continued)

*Primary Examiner* — Robert Beausoliel, Jr.
*Assistant Examiner* — Nicholas Allen
(74) *Attorney, Agent, or Firm* — Yudell Isidore Ng Russell PLLC

(57) ABSTRACT

A method for parallel processing of data organized in the form of a tree including: converting the tree into a linear array structure including a data array for storing the data of said tree and three reference arrays; determining partial workloads from the linear array structure obtained at step a; and performing parallel processing of said partial workloads. Each entry in the data array corresponding to a given node in the tree and includes three pointers. The pointers each point to a respective one of the reference arrays: a first pointer identifies the parent node of the given node, a second pointer identifies the first child node of the given node, and a third pointer identifies the sibling node of the given node.

20 Claims, 13 Drawing Sheets

OTHER PUBLICATIONS

"Asynchronous parallel game-tree search", Journal of Parallel and Distributed Computing (1994), Mark Gordon Brockington, Mark Gordon Brockington, T. Anthony Marsland, John Samson, Murray Campbell.

"A scalable distributed parallel breadth-first search algorithm on BlueGene/L", Proceedings of the ACM/IEEE Supercomputing 2005 Conference, 25-35, Yoo A., Chow E., Henderson K. and McLendon W., 2005.

"Software and Algorithms for Graph Queries on Multithreaded Architectures", Proc. IEEE Workshop on Multithreaded Architectures and Applications, 2007, Jonathan Berry, Bruce Hendrickson, Simon Kahan and Petr Konecny.

* cited by examiner

PARALLEL PROCESSING OF DATA ORGANIZED IN A TREE STRUCTURE

PRIORITY CLAIM

The present application claims benefit of priority under 35 USC §120, §365 to the previously filed Patent Application No. 09165772.6 entitled, "System and Method for Parallel Processing" with a priority date of Jul. 17, 2009. The content of that application is incorporated by reference herein.

FIELD OF THE INVENTION

This invention generally relates to a system and a method for parallel processing and in particular to a system and method for parallel processing of data organized in the form of a tree.

BACKGROUND

Tree searching and manipulation are widely used in information systems and in many data processing applications such as hierarchical data manipulation (e.g. machine vision, Geographic Information Systems (GIS) maps, DNA trees, and databases), indexing and hashing (e.g. search engines), and others. As used herein, the term "manipulation" is intended to refer to traversing a tree, passing by all nodes of that tree for data processing purposes, such as a search or an update of values to ensure consistency to some criteria. A well known example of tree manipulation is CBIR systems (acronym for "Content Based Image Retrieval") that require the algorithm to pass by approximately all tree data nodes of a very large dataset, which may probably be several millions of data nodes.

Tree data structures are typically represented in the form of multi-branched linked lists, representing links between parents and corresponding children in form of pointers/references. With such tree data structures, sub-trees appear to not be contiguous in terms of memory allocation. Trees are generally categorized as random access structures in memory access time perspective.

Conventional tree search and manipulation systems have limited memory latency because data nodes are not organized in memory in specific sequences, which makes it difficult to benefit from cache systems (due to high miss rate). This conventional tree search and manipulation process becomes worse for multi-core processors such as Cell Broadband Engine (Cell/B.E.) (Cell Broadband Engine and Cell/B.E. are trademarks of Sony Computer Entertainment, Inc., in the United States) because the Synergistic Processing Elements (SPE) have a very limited amount of Local Store space and manually controlled bandwidth, which is handled by Direct Memory Access (DMA) calls. For parallel distributed machines such as computer clusters, network bandwidth is limited and manually controlled, and transfer latency is higher.

Conventional tree data structures are accordingly not suitable for use on multi-core processors provided with software managed memory hierarchy such as Cell/B.E, where the Synergistic Processing Elements (SPE) depend on data available at their Local Stores (LS). For the same reasons, conventional tree data structures are not adapted for computer clusters with a network-connected distributed memory hierarchy.

Existing multi-core processor systems and computer clusters systems interact with their memories by some specific system calls to transfer data chunks between the system cores or nodes. The more efficient these transfers are, the more performance these systems gain.

Solutions for tree searching and manipulation are known in the domain of "parallel algorithms for tree search", in particular for game searching algorithms applications. Such solutions rely on Artificial Intelligence techniques such as "min/max" or "alpha/beta" approaches, where trees are generated in parallel. For example, in the article entitled "Efficient implementations of search trees on parallel distributed memory architectures", *Computers and Digital Techniques*, IEEE Proceedings, Colbrook A. and Smythe C., and in the article entitled "Asynchronous parallel game-tree search", *Journal of Parallel and Distributed Computing* (1994), Mark Gordon Brockington, T. Anthony Marsland, John Samson, and Murray Campbell, there is provided a set of computing units, where each computing unit generates its own tree, searches the tree, and returns some results. However, these solutions are not adapted for searching a pre-existing (i.e. resident in memory) tree data structure.

Other solutions provide conventional tree data structures that are distributed on different processing nodes, such as the one described in the article entitled "A scalable distributed parallel breadth-first search algorithm on BlueGene/L", *Proceedings of the ACM/IEEE Supercomputing 2005 Conference*, 25-35, Yoo A., Chow E., Henderson K. and McLendon W., 2005. In these solutions, data are already distributed on different memories of different computer systems. These solutions are therefore not suitable for data that are resident in the memory of a processor multi-core chip or in the memory of a master computer in a master/slave environment. Such resident data need to be distributed on several cores or computer systems to be processed efficiently. A known solution for resident data is described in the article entitled "Programming the Cell Broadband Engine Architecture: Examples and Best Practices", IBM® Redbooks® publication. This solution, specific to Cell Broadband Engine (Cell/B.E) multi-core processors, uses a Software Cache to tighten the Memory Latency gap. However, Software Caches have low performance and still makes the Cell/B.E multi-core processor not efficient when dealing with tree data structures.

In another solution described in the article "Software and Algorithms for Graph Queries on Multithreaded Architectures", *Proc. IEEE Workshop on Multithreaded Architectures and Applications*, 2007, Jonathan Berry, Bruce Hendrickson, Simon Kahan and Petr Konecny, the graph data structure as dominated by memory latency is identified. The solution provides a framework for handling the graph structure, but only for shared memory architectures. However, it is not adapted to distributed memory architectures. A similar solution exists for a CBIR (Content-Based Image Retrieval), but this solution is also limited to shared memory architecture.

The present invention overcomes the problem of conventional solutions as will be described in greater detail below.

SUMMARY

The present invention provides a method for performing parallel processing as defined in the appended independent claim 1, a computer program product according to the appended claim 12, a computer readable medium according to the appended claim 13, and a system according to the appended claim 14. Additional embodiments are defined in the appended dependent claims 2 to 11. The invention provides high performance tree manipulation on parallel systems with a manually controlled memory hierarchy (e.g., multi-cores such as Cell/B.E or computer clusters with distributed memory hierarchy). With the invention, it is possible to efficiently perform key processing applications, such as data manipulation in hierarchal databases, DNA Trees, indexing and hashing for search engines on multi-core processors with memory hierarchy and distributed computer systems.

More generally, the invention improves efficiency of tree search and manipulation on multi-core systems with software managed memory hierarchy and on computer clusters with a network-connected distributed memory hierarchy. The invention also enables benefits to be derived from parallelism on the different cores and nodes. The invention provides key advantages on multi-core processors such as the Cell/B.E for which the described functional features overcomes the limited storage constraints related to multi-core memory hierarchy. Embodiments described also provide key advantages with computer clusters having limited and manually controlled network bandwidth and higher transfer latency.

Further advantages of the present invention will become clear to the skilled person upon examination of the drawings and detailed description. It is intended that any additional advantages be incorporated herein.

BRIEF DESCRIPTION OF THE DRAWINGS

These and other features of this invention will be more readily understood from the following detailed description of the various aspects of the invention taken in conjunction with the accompanying drawings in which.

Figure 1:
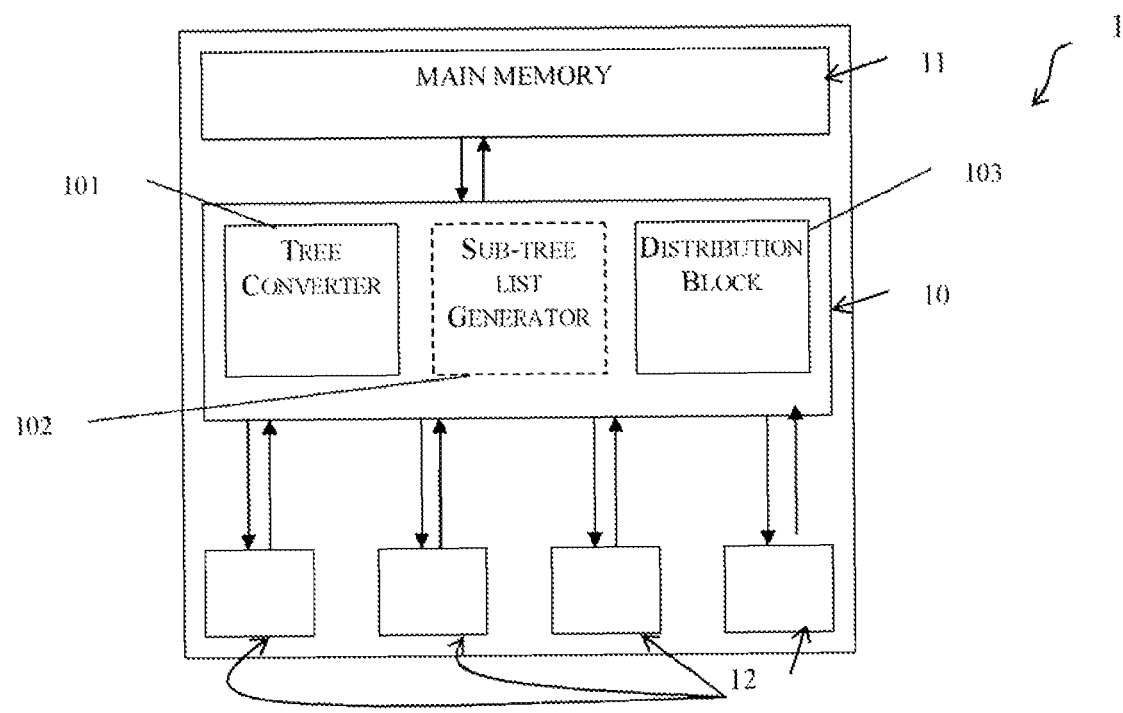
FIG. 1 depicts a system for processing workload in parallel according to certain embodiments of the invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

FIG. 1 is a diagram depicting the general structure of a system 1 for performing parallel processing according to the invention. The system 1 according to the described embodiment is a parallel distributed machine adapted for processing tasks in parallel. System 1 comprises master processing unit 10, a set of slave Processing units 12 and main memory 11.

Main memory 11 receives input trees representing data that are to be processed by the parallel distributed system 1. The input trees are rooted trees representing a hierarchy of data. Applications are responsible for manipulating tasks of the data represented as a tree. According to the described embodiment, the system 1 is provided to assign tasks represented by the input tree to the slave processing units 12 for parallel processing. The master processing unit 10 is responsible for controlling the slave processing units 12 by assigning them respective partial workloads determined from the input tree.

According to the described embodiments, the main memory 11 is arranged to store input trees in the form of a tree data array with three reference arrays: a first reference array hereinafter referred to as parent array, a second reference array hereinafter referred to as First Child array and a third reference array hereinafter referred to as Sibling array. As the data array and the reference arrays are resident in the main memory 11, the arrays are under direct access of the master processing unit 10.

The master processing unit 10 includes a tree converter 101 for converting the input tree into the linear array format according to the described embodiment, including the data array with its three reference arrays {Parent array, First Child array, Sibling array}. The conversion of the input tree into the linear array occurs if the input tree is received in a non linear array format such as a random access data structure, before storing the data in main memory 11.

Each slave processing unit 12 is adapted to notify the master processing unit 10 when the slave processing unit is available (i.e., in the idle state). In response to such notification, the master processing unit 10 sends a pre-determined partial workload to the slave processing unit 12.

The master processing unit 10 previously determines the partial workloads to be distributed to a slave processing unit from the input tree in the linear array representation according to the invention. It may also apply predefined consistency rules and other requirements related to the slaves.

The master processing unit 10 further includes a distribution block 103 for dispatching the partial workloads determined from the input tree in the linear array format into the slave processing units 12. The slave processing units 12 then perform data-intensive processing, based on the received partial workloads. The data transfer operations for transferring data between the main memory 11 and the slave processing units 12 are achieved through an adapted Memory Access mechanism, such as the Direct Memory Access (DMA) mechanism in a parallel distributed machine of the multi-core processor type.

In accordance with one aspect of the invention, the partial workload dataset to be transferred to the slave processing units may comprise a set of pre-computed sub-trees. The master processing unit 10 may then include a sub-tree list generator 102, to determine sub-tree lists, including a group of one or more sub-trees representing partial workloads. Determining partial workloads from sub-tree lists is particularly advantageous for applications requiring that sub-trees be manipulated as an atomic object by the slave processing units.

With such applications, there is a need to process sub-trees in an atomic fashion, and the slave processing units 12 need to know which data nodes belong to which sub-trees/parents. The sub-tree list generator 102 accordingly determines lists of sub-trees where each sub-tree is defined by its parent and provides them to the slave processing units 12. Each sub-tree list includes a set of sub-trees such that their total size fits in the memory of the slave processing unit. For example, DNA sequence generation applications require this type of data distribution.

The sub-tree list generator 10 may determine the list of sub-trees by parsing the input tree using the references arrays {Parent Array, First Child array, Sibling array}.

The representation of a Tree data structure into a linear array structure including a data array and three reference arrays according to the invention will now be described with reference to FIGS. 2 to 6. Such representation allows for efficient tree manipulation on parallel distributed systems in general and specifically on multi-core processors such as the Cell/B.E and computer clusters with a distributed memory hierarchy.

According to certain embodiments of the invention, each entry in the data array has three pointers to the three reference arrays to identify the parent node of the data node, the first child of the data node, and the sibling node of the data node.

Even if not limited to such tree structures, the invention has particular advantages when applied to input trees for which:
 Tree data nodes are of the same size (memory-wise);
 Tree branches are unbalanced (non-uniform tree) meaning that for a given parent, sub-trees formed from children of that parent are not equal in terms of sub-tree size; and
 Computation complexity per node is variable depending on node data only.

Figure 2:
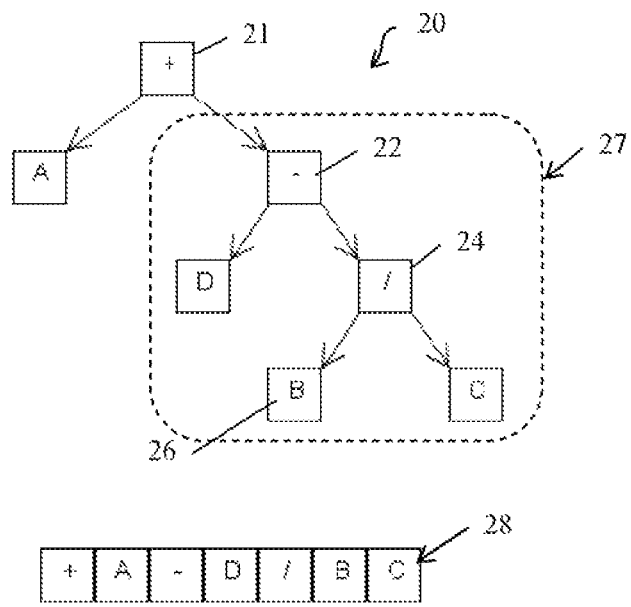
FIG. 2 represents an illustrative tree structure including mathematical operand and operators.

To facilitate understanding of the description, definitions of certain terms or expressions related to trees are provided with reference to FIG. 2. FIG. 2 depicts the general structure of a tree comprising a set of nodes. The tree structure 20 includes a Root node 21, representing the highest node in the tree hierarchy, parent nodes such a node 22, representing a node that has one or more successor nodes or children nodes such as 24. A child node 24 represents a node that is a descendant from another node (parent node 22). The number of children nodes for a single parent node defines the branching factor. The tree structure also includes leaf nodes such as 26 representing nodes that do not have a child. The tree also includes a sub-tree 27 representing a part of a tree (could be the whole tree). Each sub-tree is defined by a root node 21. The size of each sub-tree is defined by the number of nodes available in that sub-tree. The tree 20 is characterized by a depth representing the length between its root node 21 and a leaf node 26.

"Polish notation" also known as "prefix notation" may be used to represent trees in a linear array structure, according to certain embodiments of the invention. According to Polish notation, mathematical statements are represented in the form of Operator then Operand. For example, statement "A+B", where "+" designates "+" operator and "A" and "B" the operands, is represented as "+AB" in Polish notation. Such notation requires a simple parser to parse statements using this notation. As an example, the statement "A+(B/C)−D" is parsed in a tree like manner, as represented by tree 20 in FIG. 2. Similarly, trees can be represented in Polish Notation as represented by the data array 28 in FIG. 2.

Figure 3:
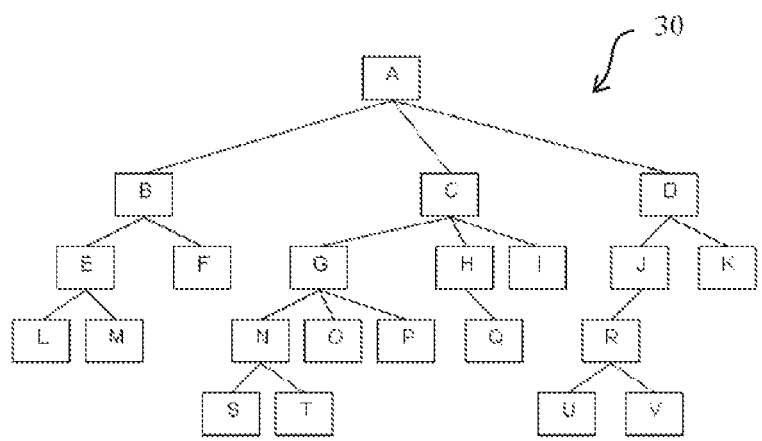
FIG. 3 represents an illustrative tree structure including data nodes and the corresponding data array.

Conversion of a tree into a data array according to Polish notation involves applying a depth first walk to build the array. However existing solutions only allow performing the reverse operation for trees in the form of operand and operator, i.e. converting from an array into a tree. But no such solutions are available for data trees such as tree 30 represented in FIG. 3, as in such a tree there are not different types of nodes. In FIG. 3, the data array 32 represents the data nodes of tree 30 in Polish notation.

With the linear array structure according to the described embodiments, including a data array and three reference arrays {parent array, first child array and sibling array}, reverse operation from the data array to its original tree can be performed.

Figure 4:
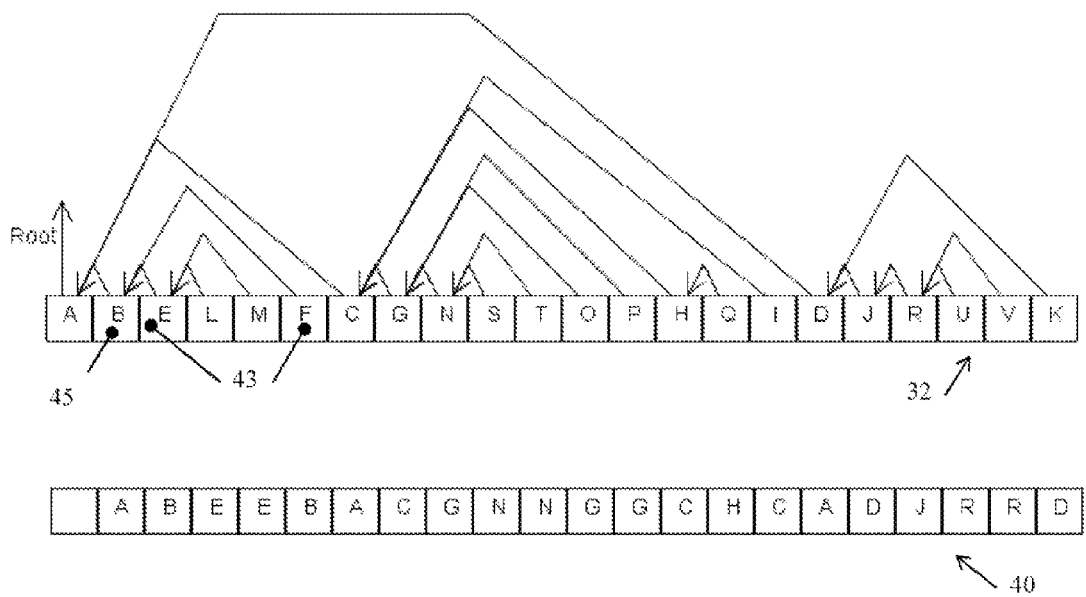
FIG. 4 represents an illustrative data array and a corresponding parent array, according to embodiments of the invention.

FIG. 4 represents the data array 32 with its associated Parent Reference array 40 according to one embodiment. With the data array 32 and the Parent array 40, any child 43 can reach its parent 45 in O(1) step, where O( ) designates Landau or asymptotic notation. However, a parent 45 can reach its children such as node 43 in O(n) steps, where n is the number of nodes in a tree.

Figure 5:
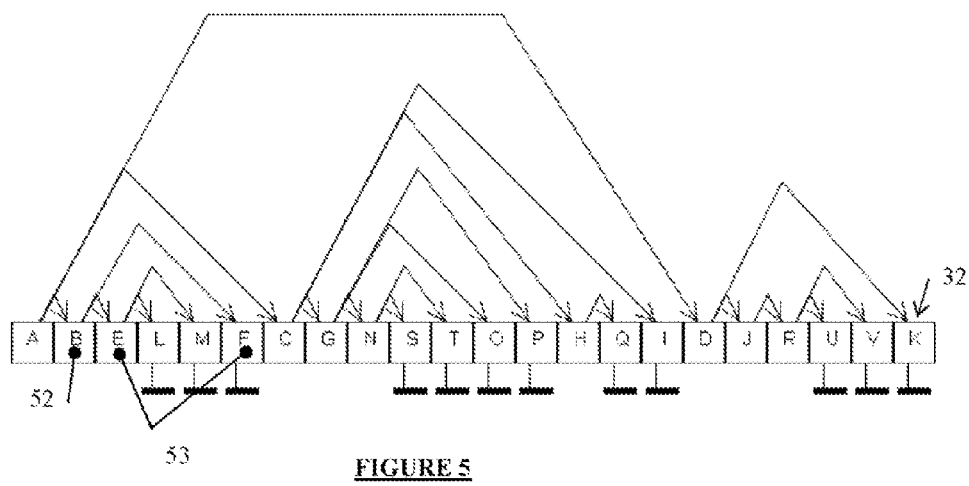
FIG. 5 represents an illustrative data array, a corresponding parent array, and children pointers.

Another array of pointers, as represented in FIG. 5, could be used to reference the children and provide additional information to the array representation of FIG. 4. With such additional information, a parent such as node 52 could reach a child such as nodes 53 in O(m) steps, where "m" is the maximum number of children per parent. The size of such data structure of children pointers would depend on:
 (a) the maximum number of children per parent (fixed memory size), or
 (b) a dynamic structure depending on the number of children per parent (variable memory size).

Figure 6:
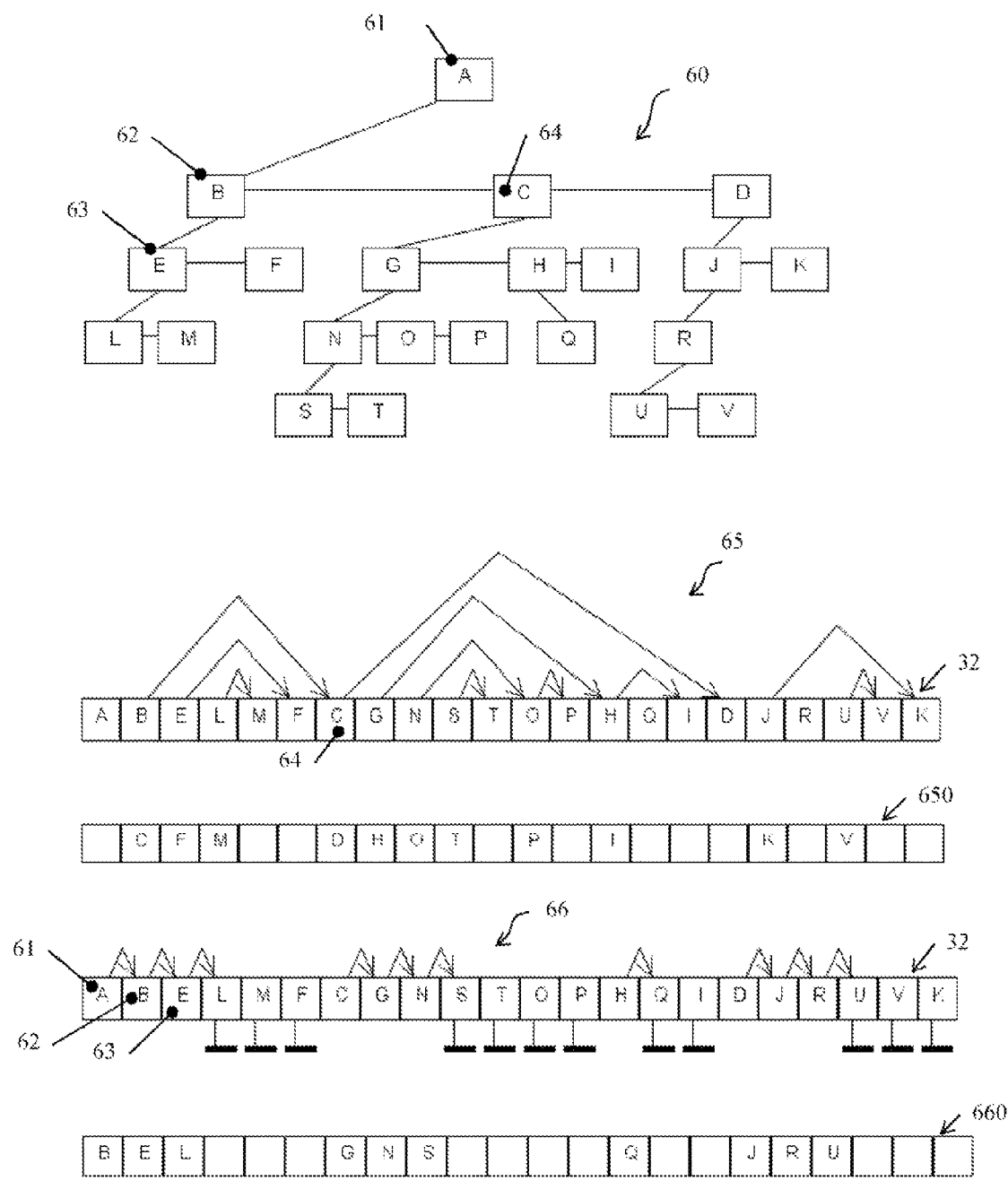
FIG. 6 represents an illustrative data array with the corresponding reference arrays according to embodiments of the invention.

Using information involves (a) wasting memory for trees with large deviation in children numbers. On the other hand, using information also (b) raises a problem of random access category. To avoid this problem, embodiments of the invention replaces the children reference array with two static size arrays, a Siblings reference array 650 and a First Child reference array 660 as illustrated in FIG. 6. Sibling and First Child relations are used to represent the relation between a parent and its children as defined in the article "Tree Traversal in C without Recursion", Valery Creux, Dr. Dobb's portal, July 2000. All children, for a given parent, are connected together in a linear fashion using the Sibling relation. A parent is connected to only one of its children using First Child relation. Thus a parent can reach any of its children through the First Child relation, and then through the Sibling relations.

FIG. 6 shows a tree 60 corresponding to an equivalent representation of tree 30 of FIG. 3 and showing for each node (or parent node), such as node 62, only the node's links with the first child node 63 and the sibling node 64. It should be understood that this modified representation of tree 30 is provided for illustrative purpose only.

In FIG. 6, reference 65 designates the data array 32 with the sibling array pointers, and reference 66 designates the data array 32 with the first child array pointers. As shown, for each node 62, only 3 pointers are required: a pointer to the Parent node 61, a pointer to the First Child node 63 and a pointer to the Sibling node 64.

Accordingly, to represent a given input tree with "n" nodes in the linear representation according to the invention, n data elements, and 3n pointers are needed, which is a static number and requires static memory size. In addition, the linear array representation according to the invention is continuous in terms of memory-wise organization. Hence, the same complexity of a child reaching to its parent is maintained in exactly a single step while a parent can reach any of its children in O(m) steps, where "m" is the maximum number of children per parent. This complexity is the same as the complexity of the original tree random access data structure built using references and pointers.

Another benefit from using the Sibling array is to easily provide sub-tree size information, for a given parent. A node could compute its sub-tree size by simply measuring the distance between its address and its sibling address using the sibling array. For special nodes with no sibling, the parent array may be used alternatively to compute the size, as the size may be computed moving upwards to the nearest parent that has a sibling. In the example of tree 60 depicting in FIG. 6, the size of the sub-tree rooted at C is 10, which is exactly the distance between C and D nodes in the sibling array.

The tree representation and data organization according to the invention permit the transfer of continuous sequence of data forming sub-trees for parallel processing by slave processing units as they form continuous sequences of data. This linear array representation is particularly suitable for parallel processing.

Figure 7:
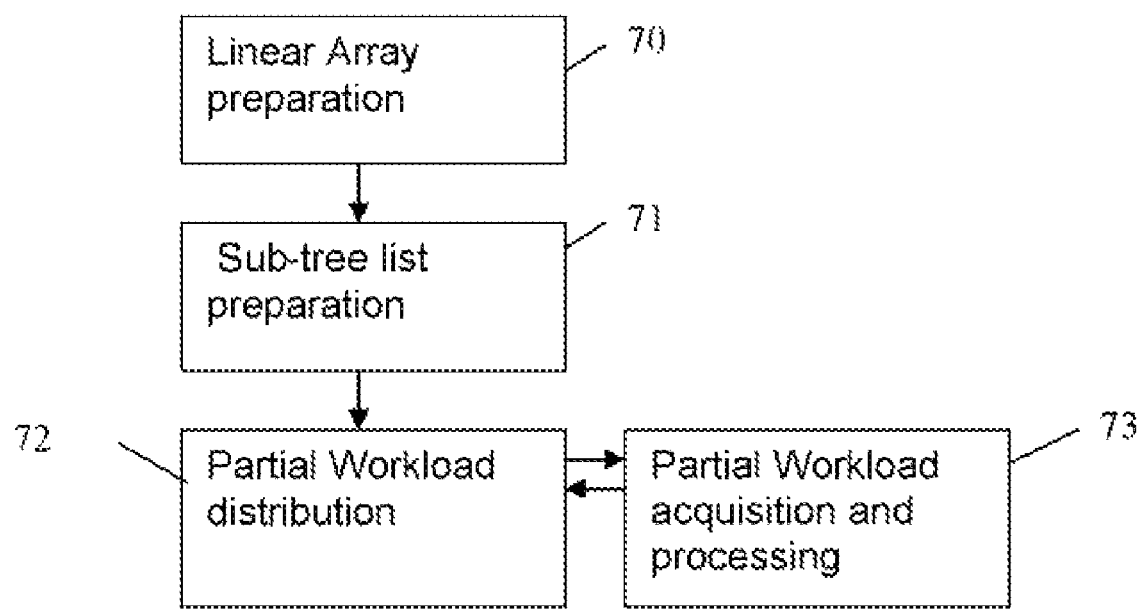
FIG. 7 shows a general flowchart for parallel processing according to certain embodiments of the invention.

FIG. 7 is a general flowchart illustrating the method for performing parallel processing according to the invention. A pre-processing step 70 is first performed to convert an input tree into a linear array structure including a data array and three references arrays {Parent array, First Child array, Sibling array} according to the linear array representation described above. At step 72, the master processing unit determines partial workloads using the data array and the three reference arrays and distributes them on slave processing units 12. At step 73, the slave processing units 12 perform a data acquisition and processing phase to process the partial workload received from the master processing unit 10. Even if represented as successive steps, steps 70 and 72 may be performed simultaneously.

The master processing unit 10 may distribute part of the workload to a slave on receiving a notification from the slave processing unit indicating that the slave is idle. This cycle then repeats until all the workload represented by the input tree is processed.

In embodiments requiring that partial workloads be computed from sub-tree lists, a sub-tree list preparation step 71 may be further performed to determine lists of sub-trees from the linear array structure and distribute datasets including sub-trees from the list of sub-trees to the slave processing units.

Figure 8:
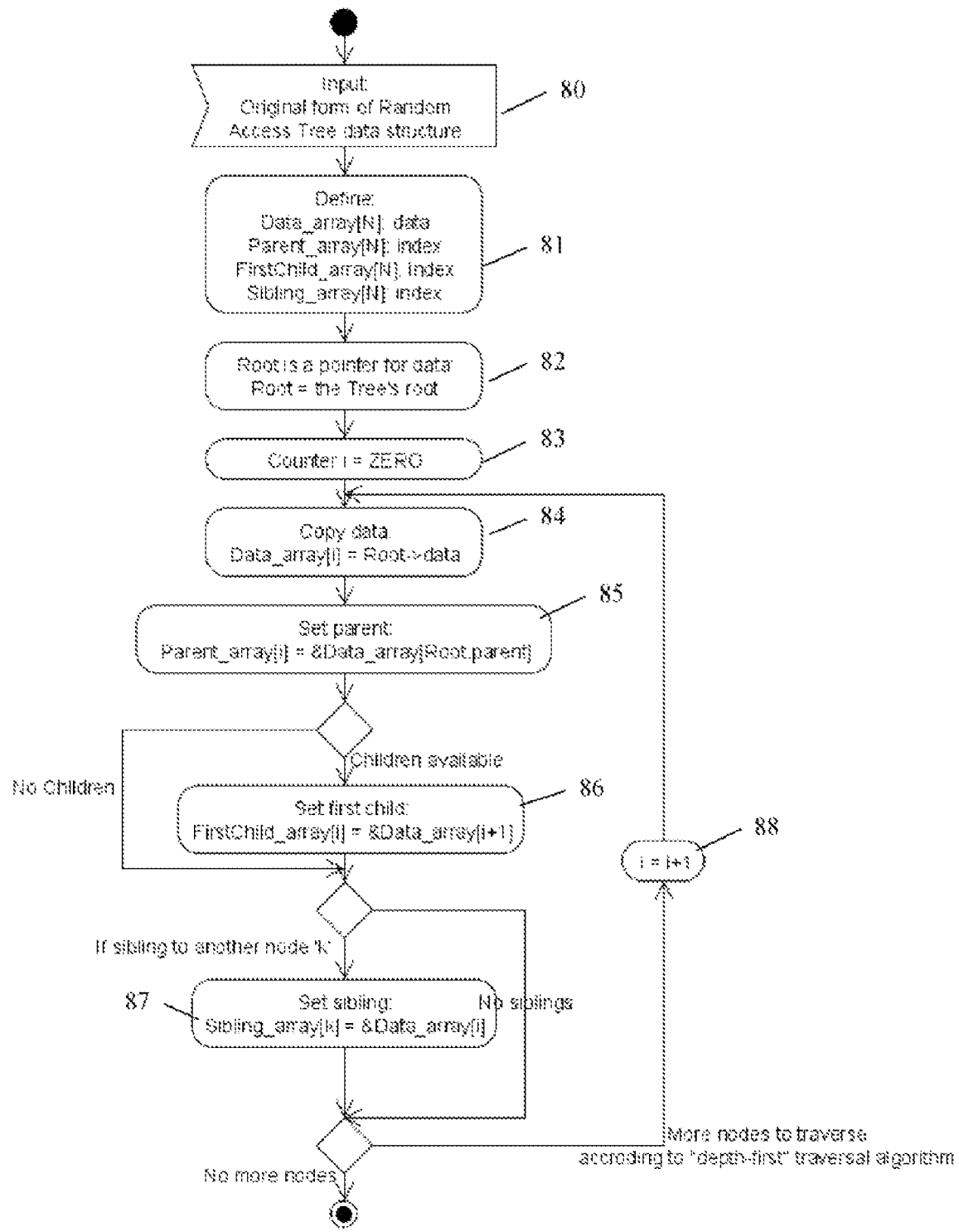
FIG. 8 shows a flowchart for conversion of a tree into the linear array structure according to certain embodiments of the invention.

FIG. 8 is a flowchart describing in more detail the pre-processing step 70 according to one embodiment of the invention. The input tree may be represented in any random access form using pointers or references between data elements that do not preserve any organization in the main memory.

At initial step 80, a random access input tree is received. For the random access input tree, an assumption is made that children for any parent node are found in any predefined order. This order will be used to determine which child node will be connected to the parent node as its First Child, and also used to determine the sibling relations, i.e. which node is sibling to which node.

At step 81, four arrays of size N (where N is the number of nodes in the tree) are allocated with the following names and types:

A data array named "Data_array" and having the same type of the data node;
A parent array named "Parent_array" and having index type (either references or integer values);
A First Child array named "FirstChild_array" and having index type (either references or integer values);
A sibling array named "Sibling_array" and having index type (either references or integer values).

At step 82, a variable "Root" is pre-created to designate a pointer for a data node and is initially set to point to the root of the input tree. At step 83, a counter "i" is initialized to zero.

A traversal algorithm, such as a depth first traversal algorithm, is then applied (e.g. using a stack or recursion) that passes by all nodes of the input tree such that at each node the algorithm performs the following steps:

At step 84, the algorithm copies the data in the original tree data node to the array Data_Array in index "i" such that "Data_array[i]=Root.data";

At step 85 the algorithm sets the parent array entry in index "i" to point to the data array of the parent of this node such that "Parent_array[i]=&Data_array[Root.parent]";

At step 86, the algorithm sets the first child array entry in index "i" to point to the data array in index "i+1" since the first child array entry is the next entry to its parent in the array, if there are children, such that: "FirstChild_array[i]=&Data_array[i+1]"

At step 87, if the current node is a sibling to another node "k" (which should be already inserted in the array), then the algorithm sets the sibling array entry in index "k" to point to the data array in index "i" such that: "Sibling_array[k]=&Data_array[i]"

The method moves on to the next element until all elements in the tree are inserted into the arrays and increments counter "i" by 1 setting "i=i+1" at step 88.

Figure 9:
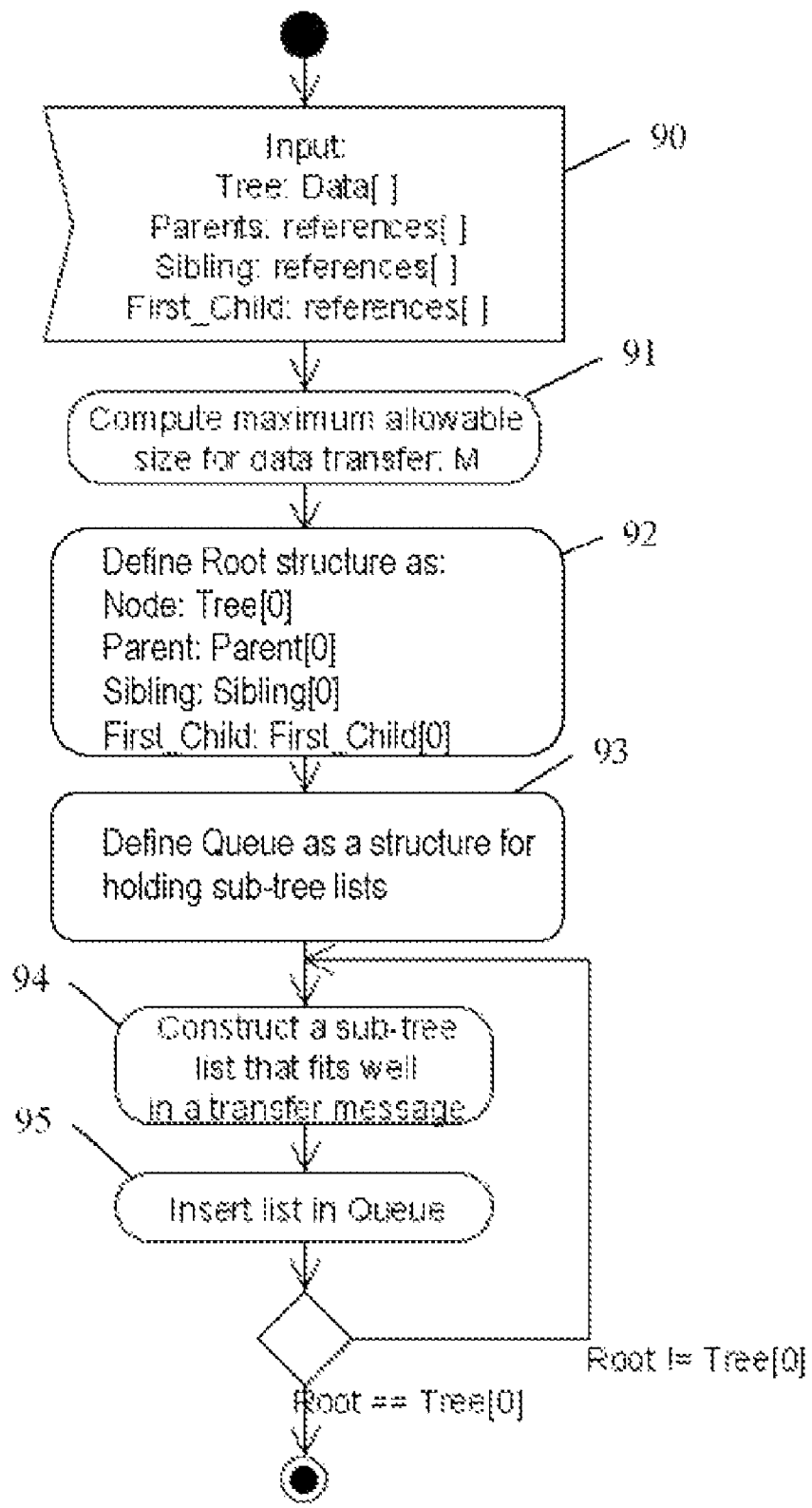
FIG. 9 shows a flowchart for determining sub-tree lists from the linear array structure.

FIG. 9 is a flowchart representing the sub-tree list preparation according to an embodiment of the invention. As this embodiment of the invention has particular advantages for parallel distributed systems in which slave processing units have memory limitations, such as a multi-core processor, the following description will be made with reference to such parallel distributed systems.

According to this embodiment of the invention, the master processing unit 12 determines the elements to be added in the sub-tree list by parsing the tree in the linear array format, using the reference arrays. The master processing unit 10 defines an initial sub-tree from the linear array structure and then determines if the current sub-tree meets size criteria for processing. The candidate sub-tree is defined by a root node. To determine if the sub-tree meets size criteria, the master processing unit 10 computes the size of the current sub-tree using the sibling array. If the root node defining the sub-tree does not have any sibling, then it goes upwards to its parent's sibling using the parent array. If the master processing unit 10 determines that the sub-tree does not meet the size criteria, then the master processing unit 10 divides the sub-tree into smaller sub-trees by moving downwards to the sub-tree's root children using the First Child array, until the master processing unit 10 obtains a sub-tree that meets the size criteria. To build the list of sub-trees, the master processing unit keeps track of the possible remaining workload size that could be added.

More specifically, at step 90, the master processing unit 10 retrieves the input tree represented in the form of one data array, and its three references arrays (Parent, Sibling and First Child). At step 91, the master processing unit computes the maximum allowable number of tree nodes, M, to be transferred to each slave processing unit 12 according to the data size of the tree nodes, and any other constraints. Depending on the type of the parallel distributed machine, the master processing unit may take into account other parameters for computing the maximum allowable number of tree nodes, such as the size of the local store (LS) for a parallel distributed machine of the multi-core processor type.

The following equation is an exemplary equation for computing the maximum allowable number of tree nodes, M, in a multi-core processor, taking into account this constraint:

M=largest data transfer size/data size of one node;
constraint: the largest data transfer size is smaller than the Local Store size.

At step 92, the master processing unit defines "Root" as a structure composed of four pointers, Node, Parent, Sibling, and First_child, which point respectively to: a data node into the data array (referred to as Tree[ ] in FIG. 9); an entry of the parent array (referred to as Parent[ ] in FIG. 9); an entry of the Sibling array (referred to as Sibling[ ] in FIG. 9); and to an entry of the First-Child array (referred to as First_Child[ ] in FIG. 9). The master processing unit sets Root to initially point to the first element on all arrays (Node=Tree[0], Parent=Parent[0], Sibling=Sibling[0], First_Child=First_Child[0]).

At step 93, the master processing unit defines a queue of lists of sub-trees adapted to carry lists of sub-trees. The queue of lists of sub-trees is stored in main memory. At step 94, the master processing unit then constructs a list of a number of sub-trees of a size smaller or equal to M as determined in step 91. At step 95, the master processing unit then inserts the determined list of sub-trees in the queue.

Figure 10:
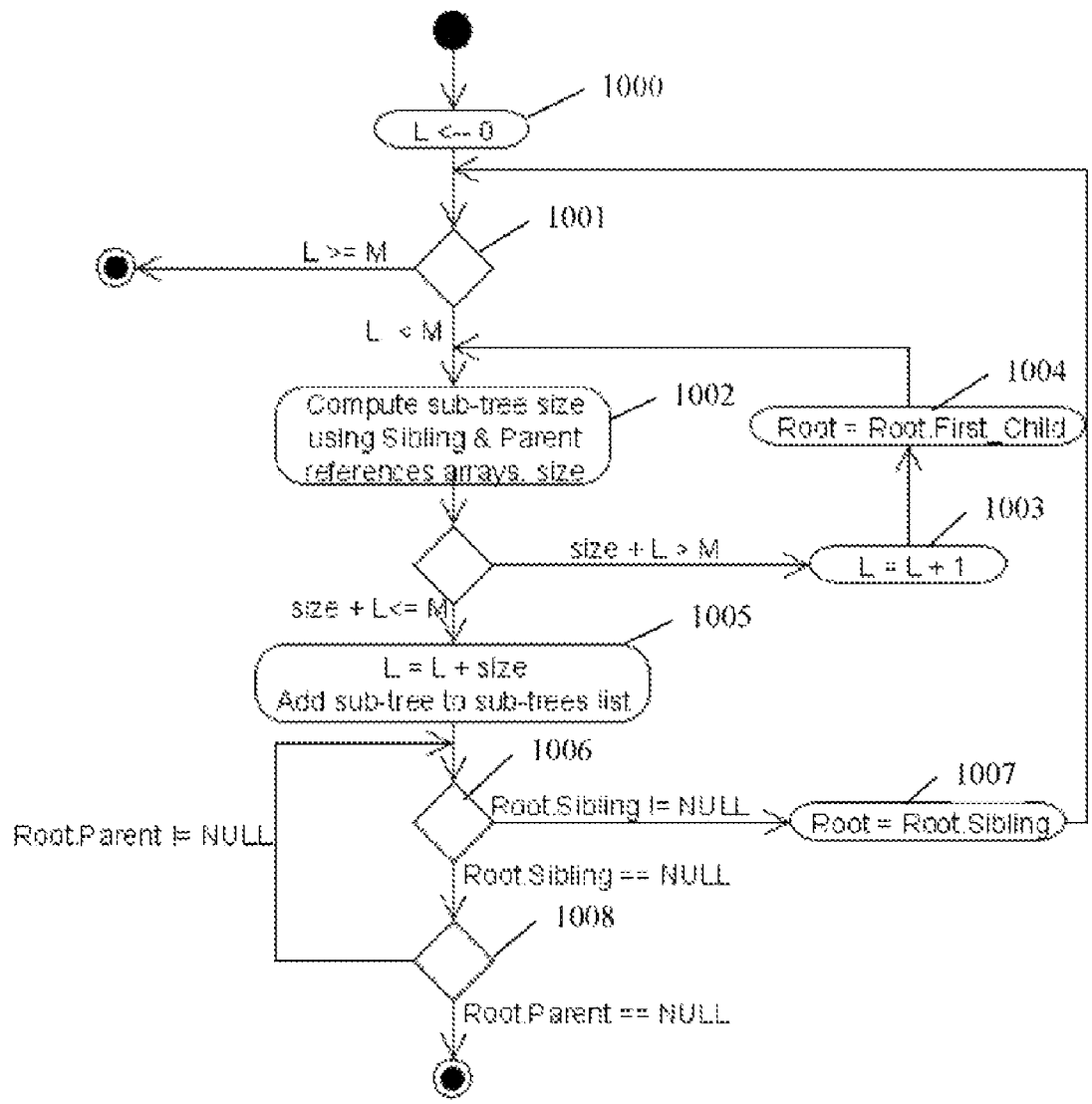
FIG. 10 shows a flowchart for constructing sub-tree lists.

FIG. 10 is a flowchart describing the step of constructing the list of sub-trees (step 94 of FIG. 9) according to one embodiment of the invention. At step 1000, the master processing unit defines a counter L to compute the number of nodes that have been added to the sub-trees list and initially sets it to zero. At step 1001, it compares counter value L to the maximum allowable size M. If it is determined that L is superior (i.e., greater/larger than) or equal to M, no more nodes can be added to the sub-tree list. The sub-tree list preparation is then terminated.

If it is determined that L is inferior to (i.e., less/smaller than) M, then the master processing unit 10 computes the sub-tree size (that "Root" is pointing to, using the sibling array) at step 1002. The sub-tree size is determined from the sibling array as the distance between the node and its sibling. Indeed, all the data elements in the sibling array located between any given node and its sibling are part of the sub-tree for which this given node is the root. If no sibling is found, then the master processing unit moves upwards to the nearest parent that has a sibling at step 1003, and computes the nearest parent's sub-tree size (reiterating step 1002). For the root of the tree which is the first array element, the sub-tree size equals the total tree size.

At step 1003, if the sub-tree size computed in step 1002 and added to L is greater than the maximum allowable size M, then L is incremented by 1 and the current node is added to the sub-tree list. The master processing unit moves downwards to the first-child from the first-child array at step 1004. The sub-tree is then divided into separate sub-trees. The master processing unit reiterates step 1002 with the new value of L and the new value of Root. If the sub-tree size computed at step 1002 and added to L is inferior (i.e., less/smaller than) or equal to the maximum allowable size M, the master processing unit sets L to be equal to the sub-tree size (computed at step 1002) added to the previous value of L, at step 1005. The sub-tree to which "Root" is pointing to is then added to sub-tree list.

At step 1007, if there are siblings, the master processing unit sets "Root" to point to its sibling. Step 1002 is reiterated with the new value of Root. At step 1008, it is determined if Root has a parent using the parent array. If Root does not have a parent, the top of the tree has been reached, and the computation of the workload is completed, thereby terminating the sub-tree list preparation. If Root has a parent, Root is set to point to its parent and step 1006 is reiterated.

The sub-tree list thus obtained is added to the queue of sub-trees lists and is ready to be transferred for processing to the slave processing unit. Since all lists of sub-trees are equally sized and prepared in advance, this embodiment of the invention has particular advantages for multi-cores or computer clusters with equal sized memory nodes applications. As the conversion of the input tree into the linear array representation proposed by the described embodiments of the invention takes place only once before performing tree manipulation, the related expected overhead is small compared to the large processing related to tree manipulation.

Figure 11:
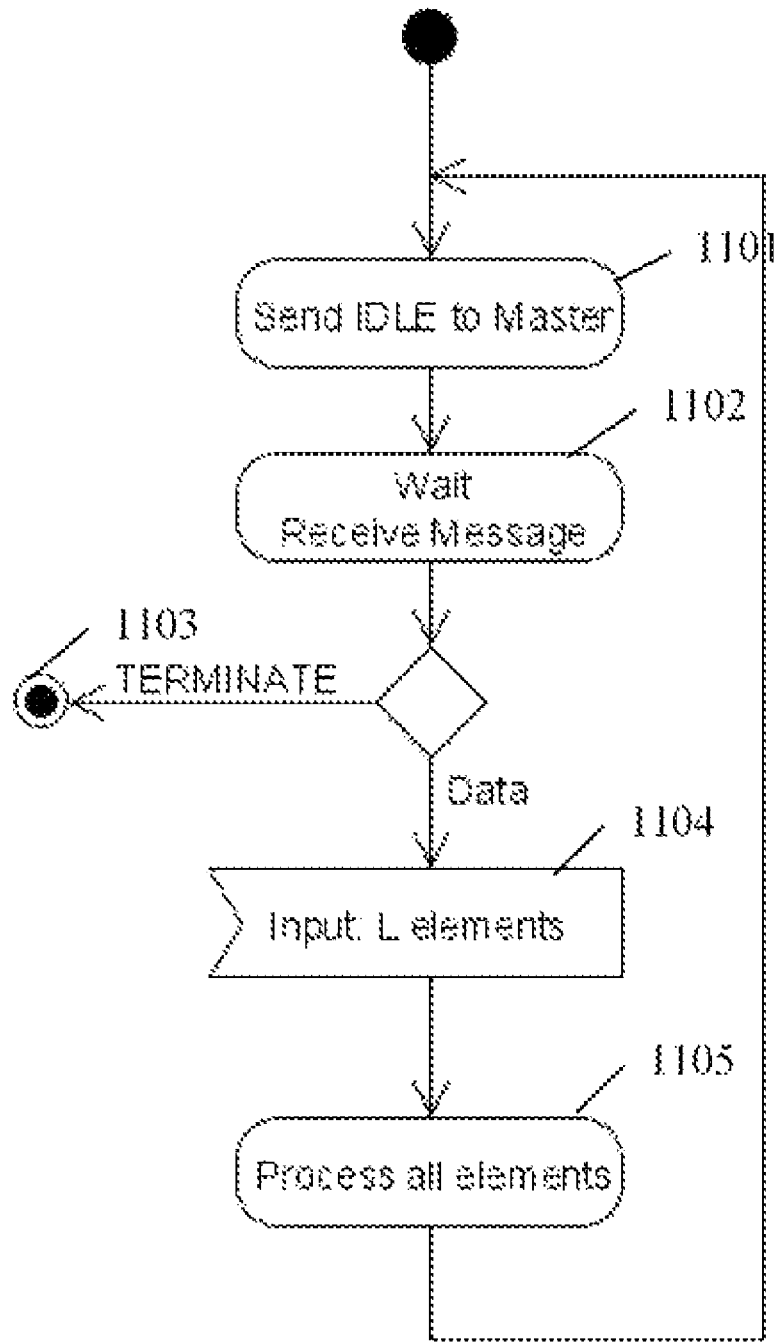
FIG. 11 shows a flowchart for processing partial workload.

FIG. 11 is a flowchart for acquiring and processing partial workloads at the slave processing units (step 73 of FIG. 7). At step 1101, a slave processing unit 12 sends an IDLE message to the master processing unit 10. At step 1102, the slave processing unit 12 waits for the master processing unit reply. At step 1104, the master processing unit replies with part of the workload in the form of a list of sub-trees. The slave processing unit 12 then processes the workload at step 1105. Workload processing depends on the nature of the application and may take any form such as, for example, data analysis, approximation, arithmetic or logic operations, and comparisons.

When the slave processing unit 12 finishes the processing of the partial workload, the slave processing unit may re-send an IDLE message to the master processing unit, thereby reiterating steps 1101 to 1105. This cycle repeats with the slave processing units until all the workload is processed and the master processing unit replies with a TERMINATE message at step 1103.

The described embodiments of the invention are not limited to the distribution of partial workload described above and encompass other alternatives depending on the type of application. For example, for applications where sub-tree manipulation requires knowledge about the sub-tree structure, step 91 of computing the maximum allowable number of nodes M (FIG. 9) that could be sent to a slave at once may further take into account the sizes of the reference arrays elements. Also, step 1104 of sending the partial workload to a slave processing unit (FIG. 11) may include sending to the slave the three reference arrays in addition to the data array. This modification allows the slaves to have knowledge about the hierarchical organization of the tree and take into account this information for processing. For other applications where the hierarchical organization of the tree is not required by slaves for processing, sending the data arrays with no reference arrays may be sufficient.

The above description has been made with reference to master/slave architecture. However the invention is not limited to master/slave architectures and can be applied to other types of architectures, such as, for example, a distributed environment architecture in which a temporary master is responsible for: dividing all the workload into several tasks such that each task size is affordable by all the computing nodes; and storing the tasks in a shared task queue. After this preliminary step, all the computing nodes become peers and each may draw a task from the task queue, perform the task, and then draw another task. The shared queue may be controlled by semaphores to maintain consistency. This task processing phase is repeated until the queue is empty.

Figure 12:
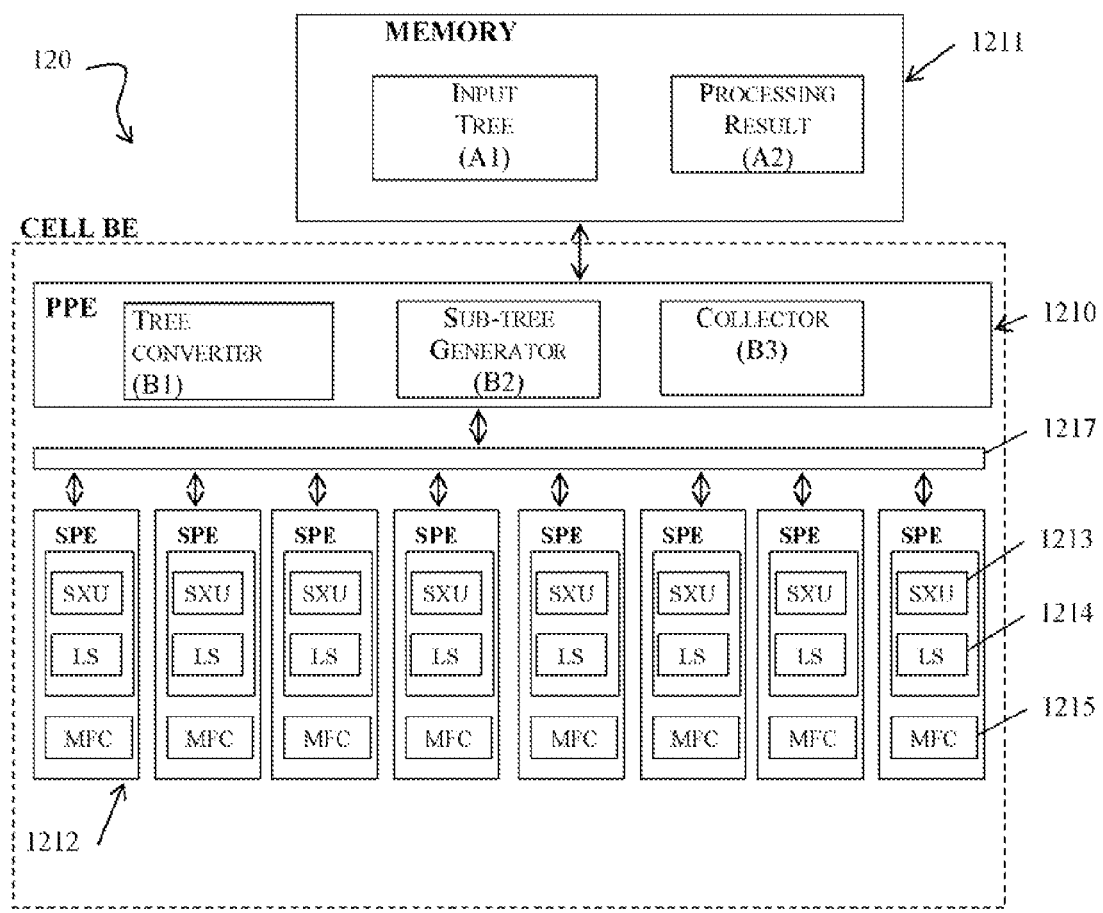
FIG. 12 represents a multi-core processor system according to certain embodiments of the invention.

FIG. 12 illustrates a multi-core processor system 120 according to other embodiments of the invention. System 120 comprises a Power PC processing core 1210 (also referred to as Power Processing Unit (PPU) or Power Processing Element (PPE) as the master processing unit and a set of Synergistic Processing cores 1212 (referred to as Synergistic Processing Unit (SPU) or Synergistic Processing Element (SPE)) as the slave processing units. PPE 1210 is a dual thread processor responsible for task control. SPE 1212 are vector processing elements used mainly for data-intensive processing. Each SPE 1212 comprises a Local Store (LS) 1214, a Synergistic Processing Unit SPU 1213 and a Memory Flow Controller (MFC) 1215. The SPU 1213 is the main processing element. It is provided to directly access the LS space which in turn holds the code and data accessed directly by an SPU 1213. The MFC 1215 is provided to manage all external communication such as data movement and synchronization. The PPE 1210 and the SPEs 1212 are connected via a communication bus 1217 referred to as the Element Interconnect Bus (EIB).

System 120 further includes a main memory 1211 for storing the tree data array and its three references arrays (Parent, Sibling & First Child). As the tree array and the reference arrays are resident in the main memory 1211, they are under direct access of the Power Processor Element (PPE) 1210.

All data transfers for transferring data between the main memory 1211 and the SPEs' local stores (LS) 1214 are achieved through Direct Memory Access (DMA) calls. The multi-core processor may be in particular deployed on the Cell/B.E microprocessor (IBM, Cell Broadband Engine Architecture, October 2006, Version 1.01.). The Cell Broadband Engine is a low-power, heterogeneous multi-core system architecture consisting of 9 processing units, which are able to run 10 threads simultaneously. The Cell/B.E. includes eight synergistic processing cores. In a Cell/B.E, each SPE comprises a 256 Kbyte Local Store (LS). The PPE and the eight SPEs are connected via a 25 Gb/s communication bus EIB.

PPE 1210, as the master processor, is also responsible for maintaining constraints such as the following constraints:
  Prevent presence of idle cores in multi-core systems (SPEs in this case) with a highest utilization in terms of computation power;
  Achieve the highest utilization for the system buses and reduce the overhead associated with data transfer by applying efficient Direct Memory Access (DMA) transfers in case of Cell/B.E; and
  Apply the minimal control traffic on the communication network, in particular by using mailboxes whenever possible for Cell/B.E, as mailboxes are much faster than traditional DMAs.

The PPE 1210 ensures preparation of the largest dataset such that the dataset fits smoothly into the local store (LS), and it does not violate consistency rules. The PPE 1210 further includes a Collector B3 for collecting the processing results from SPEs 1212 and storing the results into processing result block A2 in main memory 1211. The PPE 1210 also includes a tree converter B1 as described above to convert the input tree into a linear contiguous array of data according to the representation provided by the invention, when the initial tree is in a random access format. The converter input tree is stored in main memory 1211 in A1 to be under direct access of the Power Processor Element (PPE) 1210.

The PPE 1210 may further include a sub-tree list generator B2 as described above to determine lists of sub-trees using the reference arrays. The lists are queued as DMA (Direct Memory Access) lists. The PPE 1210 then defines the partial workloads from the lists.

Alternatively, the PPE 1210, as the master processing unit, may only perform the linear array conversion step described above to convert an initial tree structure into a linear contiguous array of data such that the data can be divided into equal sized chunks, without performing the sub-tree list preparation. The master processing unit (PPE) will dispatch the data chunks directly to slaves processing unit (SPEs), without performing the sub-tree list preparation.

Figure 13:
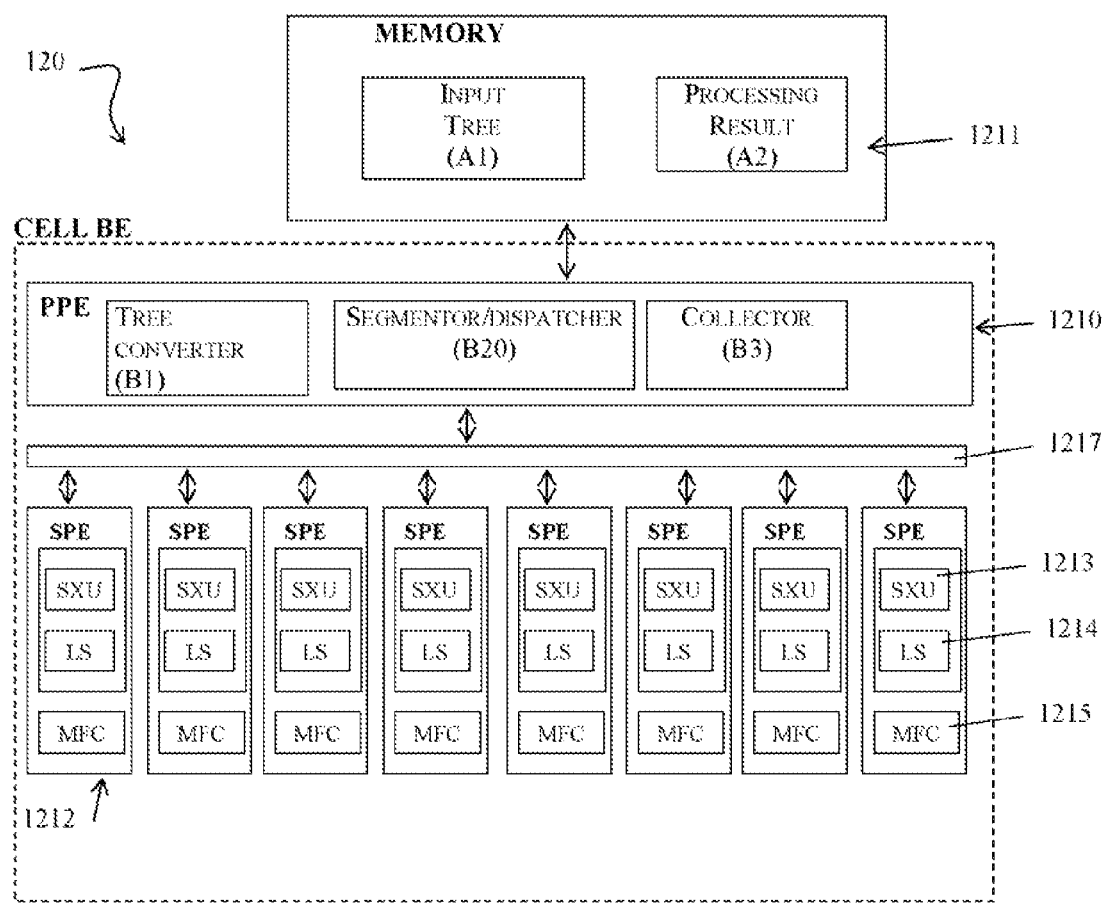
FIG. 13 represents a multi-core processor system according to alternative embodiments of the invention.

FIG. 13 depicts a multi-core processor according to this alternative embodiment of the invention. As illustrated, the PPE 1210 includes a tree converter B1 as described above to convert the input tree into a linear contiguous array of data according to the invention. The tree converter B1 converts the input tree into a linear array of data with reference arrays according to an embodiment of the invention. The PPE 1210 further comprises a Segmentor/Dispatcher B20 for dividing the linear array of data into manageable chunks of data, in particular equal sized chunks, for processing by the different SPEs 1212 and for dispatching the chunks of data to the SPEs. The PPE 1210 includes a Collector B3 for collecting the processing results from SPEs and storing the results into processing result block A2 in main memory 1211.

Figure 14:
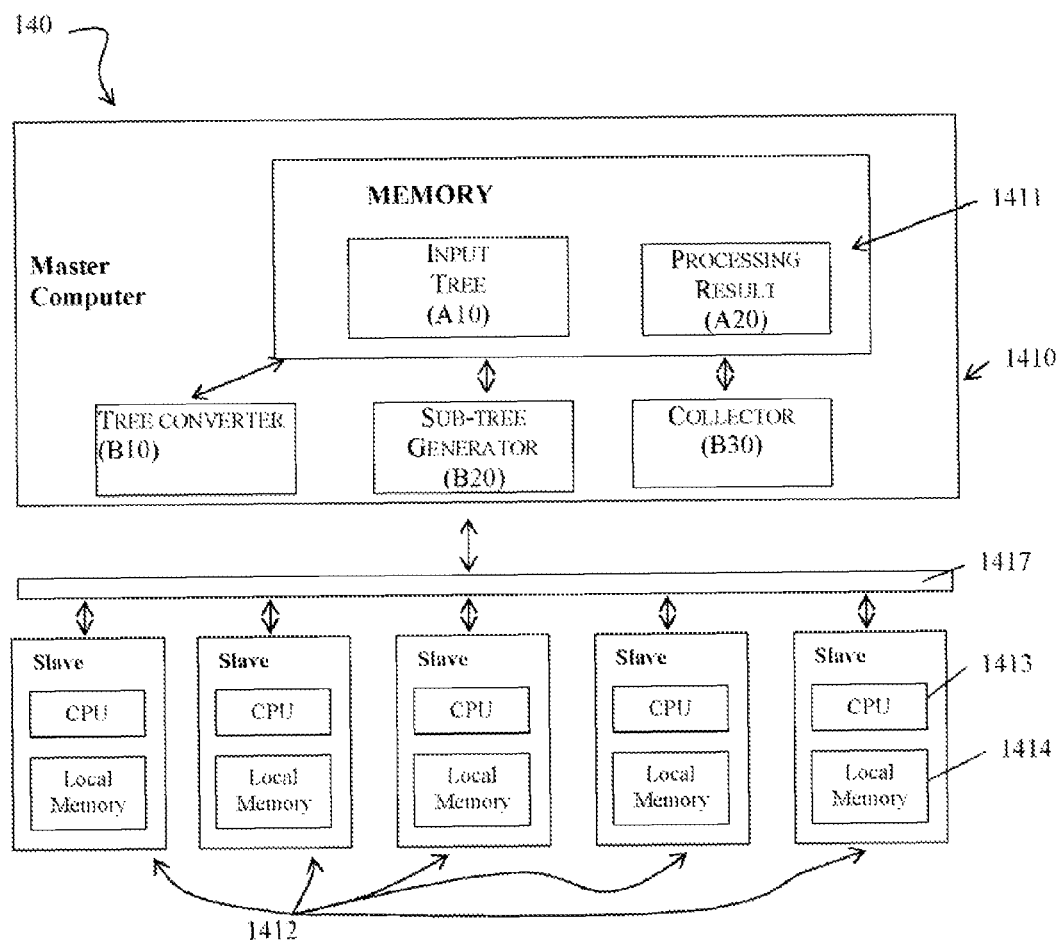
FIG. 14 represents a computer cluster system according to certain embodiments of the invention.

According to still another embodiment of the invention, there is provided a method and a system for performing task scheduling in a computer cluster of nodes with a distributed memory hierarchy. FIG. 14 illustrates a computer cluster 140 with a distributed memory hierarchy according to this embodiment of the invention. The computer cluster 140 includes a group of linked computers, working together closely. The computer cluster 140 includes a master computer 1410 as the master processing unit and a set of slave computers 1412 as slave processing units. Each slave computer 1412 comprises a local memory 1414, and a central processing unit (CPU) 1413. The CPU 1413 executes the instructions stored in the local memory 1414. The master computer 1410 and the slave computers 1412 are connected via a communication network 1417 such as the Ethernet.

In computer clusters with a distributed memory hierarchy, there are no local store constraints and the size of local memories 1414 are large. However, constraints may exist on data transfer from master computer 1410 to slave computer 1412.

Master computer 1410 includes a memory 1411 for storing the tree data array and its three reference arrays {Parent array, First Child array, Sibling array}.

While Direct Memory Access (DMA) transfers are used in multi-core processors, an equivalent system call is used in computer cluster 140 for constructed list of sub-trees.

The master computer 1410 includes a Collector B30 to collect the processing results from slaves 1412. The processing results are stored into a processing result block A20 in memory 1411. The master computer also includes a tree converter B10 to convert the input tree into a linear contiguous array of data according to the invention. The converter input tree is stored in memory 1411 in block A10.

A sub-tree list generator B20 may be further provided in the master computer 1410 to determine lists of sub-trees using the reference arrays. The lists are then queued in memory 1411 and will be used by the master computer 1410 to define partial workloads.

According to yet another embodiment of the invention, there is provided a method and a system for scheduling tasks in an unbalanced computer cluster. The unbalanced computer cluster has a similar structure to the one represented in FIG. 14 but is characterized by unequal memory nodes. In such parallel distributed system, the previously described phase of preparing sub-trees lists (step 95 of FIG. 9) is not adapted since such phase requires equally sized memory nodes.

Figure 15:
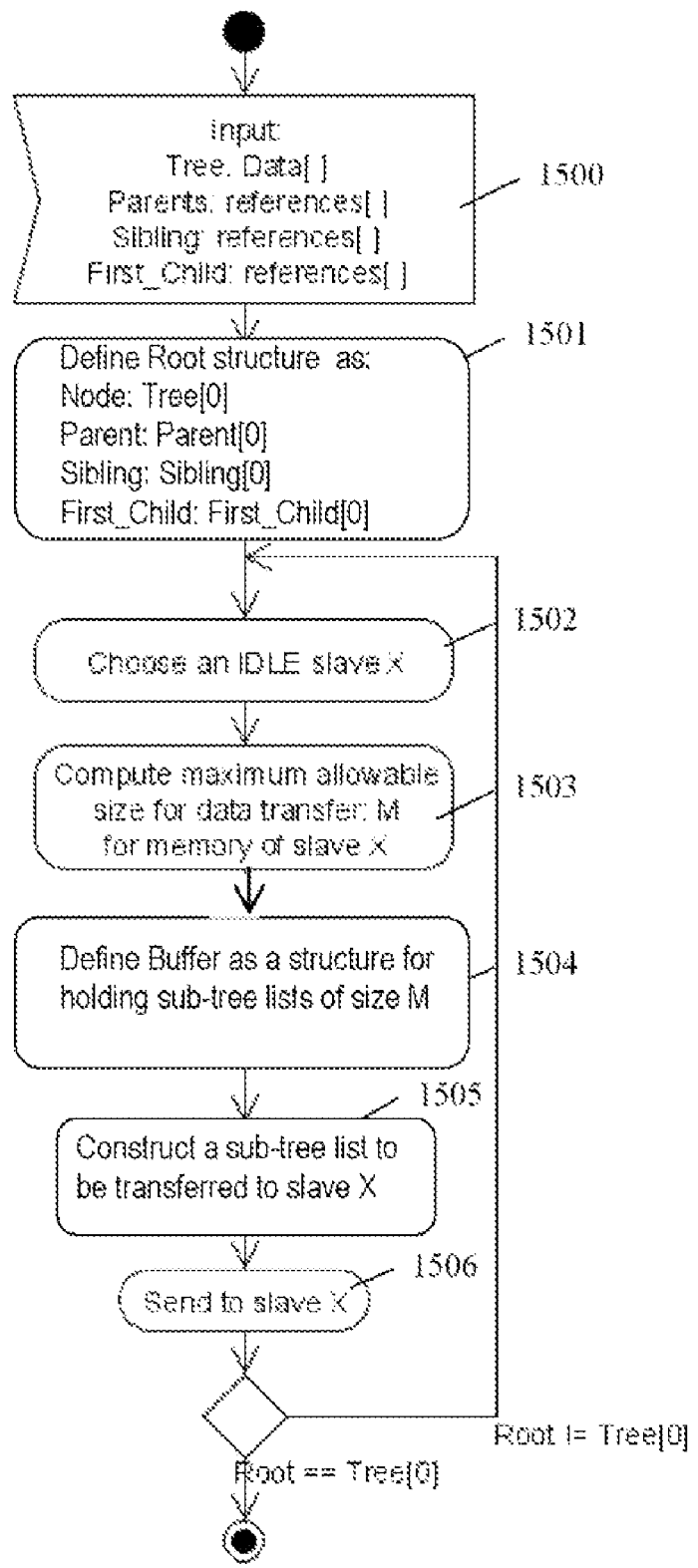
FIG. 15 shows a flowchart for determining sub-tree lists in an unbalanced computer cluster according to the invention.

FIG. 15 depicts the steps performed for preparing sub-tree lists in an unbalanced computer cluster with unequal memory nodes. According to this embodiment of the invention, sub-tree lists will be prepared, one at a time, based on the memory requirements of the slave that will do the work. More specifically, at step 1500, the master computer 1410 retrieves the input tree represented in the form of one Data array, and its three reference arrays {Parent array, First Child array, Sibling array). At step 1501, the master computer defines "Root" as a structure composed of four pointers, "Node", "Parent", "Sibling", and "First_child", which point respectively to: a data node into the data array (referred to as Tree[ ] in FIG. 15); an entry of the parent array (referred to as Parent[ ] in FIG. 15); an entry of the Sibling array (referred to as Sibling[ ] in FIG. 15); and an entry of the First-Child array (referred to as First_Child[ ] in FIG. 15). The master computer sets Root to initially point to the first element on all arrays (Node=Tree[0], Parent=Parent[0], Sibling=Sibling[0], First_Child=First_Child[0]).

At step 1502, the master computer 1410 chooses an idle slave computer X among the slave computers 1412. At step 1503, the master computer then computes the maximum allowable number of Tree nodes M to be transferred to slave computer X according to the data size of the Tree nodes, and the size of the local memory 1414 of slave computer X. At step 1504, the master computer 1410 creates a buffer structure to hold a sub-trees list of size M. The buffer is stored in memory 1411. At step 1505, the master computer 1410 constructs a sub-tree list of a number of sub-trees of a size smaller or equal to M, and stores the sub-trees in the buffer. At step 1506, the master computer 1410 sends to slave computer X the list of sub-trees from the buffer for processing. Steps 1502 to 1506 are repeated until all the tree nodes have been processed.

According to this embodiment of the invention, the maximum sub-trees list size is variable, based on the slave memory requirements. Further, queuing the sub-trees lists is not required, as after preparation of each sub-tree list, instead of insertion in a queue, the sub-tree list is directly sent to the slave.

With the described embodiments of the invention, any computation done at the master side for preparing workloads for the slaves is overlapped (hidden) by the processing at the slaves. Hence no overhead is occurring for the workload preparation process.

The linear data array representation according to the invention preserves the properties of the original tree, while allowing for efficient tree manipulation on parallel distributed machines in general, and specifically on multi-core processors such as the Cell/B.E or a computer cluster.

The invention allows for linear allocation of tree in memory so that iterators can work on trees. By transforming the tree data structure into a linear array, its distribution to the processing units is facilitated by dividing them across the local stores of a multi-core system or local memories of compute clusters. More generally, the invention is not limited to the above described architectures and may apply on a wide set of architectures.

The system and the method according to the invention permit handling of tree workloads and preserving high utilization of the different cores of multi-core processors or the nodes of a computer cluster. Embodiments of the invention also allow achieving a high performance tree manipulation algorithm on parallel systems with a manually controlled memory hierarchy (multi-cores such as Cell/B.E or computer clusters with distributed memory hierarchy). Further, the embodiments creates an easier parallel programming environment that deals with tree data structures in substantially the same way as dealing with data arrays.

With the described embodiments of the invention, processing of a great number of applications is possible, such as manipulating data in hierarchal databases, DNA Trees, indexing and hashing for search engines, on multi-core processors with memory hierarchy and distributed computer systems.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. Thus, in one embodiment, the computer-usable or computer readable medium is a computer readable storage medium.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method for parallel processing of data organized in the form of a tree, the method comprising:
converting the tree into a linear array structure including a data array for storing the data of the tree and three reference arrays, wherein each entry in the data array corresponds to a given node in the tree and includes three pointers, with each of the three pointers pointing to a respective one of the three reference arrays, wherein a first one of the pointers identifies a parent node of the given node, a second one of the pointers identifies a first child node of the given node, and a third one of the pointers identifies a sibling node of the given node;
determining partial workloads from the linear array structure; and
performing parallel processing of the partial workloads.

2. The method of claim 1, wherein the data from the tree is stored in the data array using a Polish representation.

3. The method of any preceding claims, wherein the converting of the tree into a linear array structure comprises:
parsing the tree to obtain one or more parsed nodes;
initially setting a current index to zero; and
for each parsed node and for a current index in the data array:
copying the data associated with the parsed node into the data array at the current index;
setting a first reference array at the current index to point to the data array entry corresponding to the parent node of the parsed node in the tree;
if the parsed node has at least one child in the input tree, setting a second reference array at the current index to point to data array value at index (current index+1);
if the parsed node is a sibling to another node in the input tree and if the another node has an index k in the data array, setting a third reference array at index k to point to the data array value at index i; and
incrementing the current index by one.

4. The method of claim 1, wherein:
the determining partial workloads includes dividing the linear data array into equally sized data chunks; and
the performing parallel processing of the partial workload includes processing the data chunks in parallel.

5. The method of claim 1, wherein the determining partial workloads comprises determining lists of sub-trees from the linear array structure, each sub-tree representing a partial workload.

6. The method of claim 5, wherein the determining lists of sub-trees comprises:
defining a root structure representing a candidate sub-tree, the root structure being composed of four pointers pointing respectively to a data node into the data array and to three entries into the three reference arrays;
computing the size of the candidate sub-tree using a third reference array;
determining if the size of the sub-tree matches a predefined condition;
if the size of the sub-tree matches the predefined condition, adding the candidate sub-tree into the list of sub-trees;
setting root to point to its sibling using the third reference array; and
for each new value of root, performing the computing, determining and adding steps.

7. The method of claim 6, further comprising setting root to point to its first child using a second reference array if it is determined that the sub-tree does not match the predefined condition.

8. The method of claim 6, the computing of the size of the candidate sub-tree further comprising setting root to point to its parent sibling using a first reference array if it is determined that root does not have any siblings.

9. The method of claim 6, wherein the determining if the size of the sub-tree matches the predefined condition further comprises comparing the size of the candidate sub-tree added to a number of nodes in the list of sub-trees with available space for partial workload.

10. The method of claim 6, wherein determining partial workload further includes queuing the list of sub-trees for processing.

11. A computer program product comprising a computer readable device having encoded thereon computer program code that when executed of a data processing device performs the method of:
converting data organized in the form of a tree into a linear array structure including a data array for storing the data of the tree and three reference arrays, wherein each entry in the data array corresponds to a given node in the tree and includes three pointers, with each of the three pointers pointing to a respective one of the three reference arrays, wherein a first one of the pointers identifies a parent node of the given node, a second one of the pointers identifies a first child node of the given node, and a third one of the pointers identifies a sibling node of the given node;
determining partial workloads from the linear array structure; and
performing parallel processing of the partial workloads.

12. The computer program product of claim 11, wherein the program code for performing the converting of the tree into a linear array structure further comprises program code for:
parsing the tree to obtain one or more parsed nodes;
initially setting a current index to zero; and
for each parsed node and for a current index in the data array:
copying the data associated with the parsed node into the data array at the current index;
setting a first reference array at the current index to point to the data array entry corresponding to the parent node of the parsed node in the tree;
if the parsed node has at least one child in the input tree, setting a second reference array at the current index to point to data array value at index (current index+1);
if the parsed node is a sibling to another node in the input tree and if the another node has an index k in the data array, setting a third reference array at index k to point to the data array value at index i; and
incrementing the current index by one.

13. The computer program product of claim 11, wherein:
the program code that performs the determining partial workloads includes program code for dividing the linear data array into equally sized data chunks; and
the program code that performs the parallel processing of the partial workload includes program code for processing the data chunks in parallel.

14. The computer program product of claim 11, wherein the program code that performs the determining partial workloads further comprises program code for determining lists of sub-trees from the linear array structure, each sub-tree representing a partial workload, wherein the determining lists of sub-trees comprises:
defining a root structure representing a candidate sub-tree, the root structure being composed of four pointers pointing respectively to a data node into the data array and to three entries into the three reference arrays;
computing the size of the candidate sub-tree using a third reference array;
determining if the size of the sub-tree matches a predefined condition;
if the size of the sub-tree matches the predefined condition, adding the candidate sub-tree into the list of sub-trees;
setting root to point to its sibling using the third reference array; and
for each new value of root, performing the computing, determining and adding steps.

15. The computer program product of claim 14, wherein:
the program code for determining lists of sub-trees from the linear array structure further comprises program code for performing the following functions:
setting root to point to its first child using a second reference array if it is determined that the sub-tree does not match the predefined condition; and
setting root to point to its parent sibling using a first reference array if it is determined that root does not have any siblings;
the program code for determining if the size of the sub-tree matches the predefined condition further comprises program code for comparing the size of the candidate sub-tree added to a number of nodes in the list of sub-trees with available space for partial workload; and
the program code for determining partial workload further includes program code for queuing the list of sub-trees for processing.

16. A data processing system comprising:
a processor;
a storage coupled to the processor; and
program code that executes on the processor that enables the data processing system to:
convert data organized in the form of a tree into a linear array structure including a data array for storing the data of the tree and three reference arrays, wherein each entry in the data array corresponds to a given node in the tree and includes three pointers, with each of the three pointers pointing to a respective one of the three reference arrays, wherein a first one of the pointers identifies a parent node of the given node, a second one of the pointers identifies a first child node of the given node, and a third one of the pointers identifies a sibling node of the given node;

determine partial workloads from the linear array structure; and perform parallel processing of the partial workloads.

17. The data processing system of claim 16, wherein the program code for performing the converting of the tree into a linear array structure further comprises program code that enables the data processing system to:

parse the tree to obtain one or more parsed nodes;

initially set a current index to zero; and for each parsed node and for a current index in the data array:

copy the data associated with the parsed node into the data array at the current index;

set a first reference array at the current index to point to the data array entry corresponding to the parent node of the parsed node in the tree;

if the parsed node has at least one child in the input tree, set a second reference array at the current index to point to data array value at index (current index+1);

if the parsed node is a sibling to another node in the input tree and if the another node has an index k in the data array, set a third reference array at index k to point to the data array value at index i; and increment the current index by one.

18. The data processing of claim 16, wherein:

the program code that performs the determining partial workloads includes program code to divide the linear data array into equally sized data chunks; and the program code that performs the parallel processing of the partial workload includes program code to process the data chunks in parallel.

19. The data processing system of claim 16, wherein the program code to determine partial workloads further comprises program code to determine lists of sub-trees from the linear array structure, each sub-tree representing a partial workload, wherein the program code to determine lists of sub-trees further comprises program code that enables the data processing system to:

define a root structure representing a candidate sub-tree, the root structure being composed of four pointers pointing respectively to a data node into the data array and to three entries into the three reference arrays;

compute the size of the candidate sub-tree using a third reference array;

determine if the size of the sub-tree matches a predefined condition;

if the size of the sub-tree matches the predefined condition, add the candidate sub-tree into the list of sub-trees;

set root to point to its sibling using the third reference array; and for each new value of root, perform the compute, determine and add steps.

20. The data processing system of claim 19, wherein:

the program code to determine lists of sub-trees from the linear array structure further comprising program code that enables the data processing system to:

setting root to point to its first child using a second reference array if it is determined that the sub-tree does not match the predefined condition; and setting root to point to its parent sibling using a first reference array if it is determined that root does not have any siblings;

the program code to determine if the size of the sub-tree matches the predefined condition further comprises program code that enables the data processing system to compare the size of the candidate sub-tree added to a number of nodes in the list of sub-trees with available space for partial workload; and the program code to determine partial workload further comprises program code that enables the data processing system to queue the list of sub-trees for processing.

* * * * *